US012697638B2

(12) United States Patent
Losiewicz et al.

(10) Patent No.: US 12,697,638 B2
(45) Date of Patent: Aug. 4, 2026

(54) TWO-STAGE DISPENSING UNIT

(71) Applicant: Illinois Tool Works Inc., Glenview, IL (US)

(72) Inventors: William A. Losiewicz, Douglas, MA (US); Ronald J. Forget, Douglas, MA (US); Patsy A. Mattero, Smithfield, RI (US)

(73) Assignee: Illinois Tool Works Inc., Glenview, IL (US)

(*) Notice: Subject to any disclaimer, the term of this patent is extended or adjusted under 35 U.S.C. 154(b) by 191 days.

(21) Appl. No.: 18/618,331

(22) Filed: Mar. 27, 2024

(65) Prior Publication Data

US 2025/0303433 A1 Oct. 2, 2025

(51) Int. Cl.
*B05C 5/02* (2006.01)
*B05C 11/10* (2006.01)

(52) U.S. Cl.
CPC ........ *B05C 5/0225* (2013.01); *B05C 11/1028* (2013.01); *B05C 11/1034* (2013.01)

(58) Field of Classification Search
CPC ............... B05C 5/0225; B05C 11/1028; B05C 11/1034; B05C 5/0237; B05B 1/306
See application file for complete search history.

(56) References Cited

U.S. PATENT DOCUMENTS 4,066,188 A * 1/1978 Scholl ................... B05C 5/0225 392/484
4,711,379 A * 12/1987 Price ....................... B05C 5/001 91/363 R
4,801,051 A * 1/1989 Lewis ................... B05C 5/0237 251/285
5,207,352 A * 5/1993 Porter ................... B29B 7/7409 222/1
5,277,344 A * 1/1994 Jenkins ................. B05C 5/0225 222/518
6,253,957 B1 * 7/2001 Messerly ............. B05C 5/0225 222/61
6,267,266 B1 * 7/2001 Smith .................. G01F 13/006 222/61

(Continued)

FOREIGN PATENT DOCUMENTS

CN 102615018 B 5/2015

*Primary Examiner* — Vishal Pancholi
(74) *Attorney, Agent, or Firm* — Lando & Anastasi, LLP

(57) ABSTRACT

A dispensing unit includes a main housing having a main chamber, a reciprocating piston, a nozzle, and an adjuster assembly. The adjuster assembly includes an adjuster housing having an adjuster chamber co-axial with the main chamber. The adjuster assembly further includes an actuator disposed in the adjuster chamber and axially movable within the adjuster chamber. The actuator is configured to engage the reciprocating piston assembly and to drive the downward movement of the reciprocating piston assembly. The reciprocating piston assembly includes a first piston portion having a lower end configured to pressurize fluid within an orifice of the nozzle and a second piston portion that is separate from the first piston portion and having an upper end configured to engage the actuator. The first piston portion is configured to move a first distance and the second piston portion is configured to move a second distance.

20 Claims, 7 Drawing Sheets

(56) References Cited

U.S. PATENT DOCUMENTS

| | | | | |
|---|---|---|---|---|
| 7,900,800 | B2 * | 3/2011 | Hassler, Jr. | B05C 5/0237 222/593 |
| 7,980,197 | B2 | 7/2011 | Prentice et al. | |
| 8,069,653 | B2 * | 12/2011 | Ganzer | F16K 25/005 239/533.9 |
| 8,939,330 | B2 * | 1/2015 | Ross | B05B 7/166 239/533.15 |
| 9,314,812 | B2 * | 4/2016 | Clark | B23K 3/0623 |
| 9,339,839 | B2 | 5/2016 | Fliess et al. | |
| 2006/0157517 | A1 * | 7/2006 | Fiske | B05C 5/0225 222/504 |
| 2008/0061080 | A1 * | 3/2008 | Riney | B05C 5/001 222/504 |
| 2008/0105703 | A1 * | 5/2008 | Prentice | H01L 21/67005 222/63 |
| 2010/0294810 | A1 * | 11/2010 | Ikushima | B05C 5/0237 222/387 |
| 2020/0222921 | A1 | 7/2020 | Ineichen | |
| 2022/0305518 | A1 * | 9/2022 | Puffe | B05C 5/027 |

* cited by examiner

TWO-STAGE DISPENSING UNIT

BACKGROUND OF THE DISCLOSURE

1. Field of the Disclosure

This disclosure relates generally to apparatus and methods for dispensing a viscous material on a substrate, such as a printed circuit board.

2. Discussion of Related Art

Viscous material dispensers having dispensing units for dispensing electronic assembly materials operate in a variety of manners. Some well-known dispensing units use servo motors to drive a rotary auger, while some dispensing units use linear servo motors to drive a piston. Other dispensing units do not use an electric servo motor, but instead rely on other means for actuation. One such dispensing unit includes a dispensing valve or unit that operates by moving a piston away from a seat using pneumatic pressure, thereby compressing a spring, and then releasing the pneumatic pressure to allow the spring to accelerate the piston back against the seat. With this dispensing unit, a droplet of material is forced out of an orifice at the seat as the piston contacts the seat. In such a dispensing unit, a solenoid valve is typically used to control the flow of air (or other gas) into and out of the piston chamber.

FIG. 1 illustrates one such dispensing unit 1. As shown, the dispensing unit 1 includes a main housing 2 including an elongate cylindrical chamber 3 formed in the housing. The dispensing unit further includes a nozzle assembly 4 secured to a lower end of the housing 2 and an elongate piston 5 disposed within the chamber 3. The piston 5 is configured to move up-and-down within the chamber 3. A lower end of the piston 5 engages a valve seat 6 associated with the nozzle assembly 4. The chamber 3 defines a dispensing cavity that is in fluid communication with a material supply feed tube 7, which is adapted to receive material from a material supply assembly. The material supply feed tube 7 introduces viscous material within the chamber 3 through an inlet. The viscous material is delivered to the chamber to a small dispensing cavity under pressure.

The reciprocating piston 5 is actuated by an actuator, with a lower end configured to engage the valve seat 6. The amount of material dispensed by the dispensing unit 1 is controlled by an air lift distance 8 (FIG. 2A) and a fluid intake lift distance 9 (FIG. 2B) of the dispensing unit. Specifically, the air lift distance 8 has an effect of a jetted dot size by influencing the velocity of the piston 5. A greater air lift distance 8 results in a higher velocity piston impact on the valve seat 6 to impart a higher level of kinetic energy to increase the ability to jet smaller sized dots. In addition, the fluid intake lift distance 9 also influences the jetted dot size. A smaller fluid intake lift distance 9 of the piston 5 results in a smaller fluid volume intake to produce a smaller jetted dot.

To jet smaller dots of material, with the dispensing unit 1 shown in FIG. 1, the dispensing unit does not allow the independent adjustment of the air lift distance 8 and the fluid intake lift distance 9. As shown in FIGS. 2A and 2B, an increase in the air lift distance 8 results in a linear corresponding increase in the fluid intake lift distance 9, and conversely a decrease in the air lift distance 8 results in a linear corresponding decrease in the fluid intake lift distance

9. The structure of the piston 5 prevents the independent adjustment of these two factors.

SUMMARY OF THE DISCLOSURE

One aspect of the present disclosure is directed to a dispenser configured to dispense material on a substrate. In one embodiment, the dispenser comprises a frame, a support coupled to the frame and configured to receive the substrate, a gantry coupled to the frame, and a dispensing unit supported by the gantry and configured to dispense material on the substrate. The dispensing unit includes a main housing having a main chamber, a reciprocating piston assembly disposed in the main chamber and axially movable within the main chamber, and a nozzle coupled to the main housing. The nozzle has an orifice that is co-axial with the main chamber of the housing. The dispensing unit further includes an assembly coupled to the dispensing unit and configured to drive the up-and down movement of the reciprocating piston assembly. The assembly includes a housing coupled to the main housing. The housing has a chamber co-axial with the main chamber. The assembly further includes an actuator disposed in the chamber and axially movable within the chamber. The actuator is configured to engage the reciprocating piston assembly and to drive the downward movement of the reciprocating piston assembly. The reciprocating piston assembly includes a first piston portion having a lower end configured to pressurize fluid within the orifice of the nozzle and a second piston portion that is separate from the first piston portion and having an upper end configured to engage the actuator. The first piston portion is configured to move a first distance and the second piston portion is configured to move a second distance.

Embodiments of the dispenser further may include threadably coupling the housing to the main housing to adjust the second distance of the second piston portion. The dispensing unit further may include a spring disposed within the chamber and configured to engage the actuator. The spring may be configured to bias the actuator in a downward direction. The dispensing unit further may include an air lift piston body secured to the second piston portion. The air lift piston body may be configured to drive the upward movement of the second piston portion and the actuator when pressurized air is delivered to a portion of the chamber below the air lift piston body. The actuator may include a flange provided at an end of the actuator. The flange may be configured to engage the housing when moving the second distance. The dispensing unit further may include a fluid lift adjuster secured to the main housing. The fluid lift adjuster may be configured to limit the first distance movement of the first piston portion. The first piston portion may include a collar configured to engage the fluid lift adjuster to limit the first distance of movement of the first piston portion.

Another aspect of the present disclosure is directed to a dispensing unit of a dispenser configured to dispense material on a substrate. In one embodiment, the dispensing unit comprises a main housing having a main chamber, a reciprocating piston assembly disposed in the main chamber and axially movable within the main chamber, and a nozzle coupled to the main housing. The nozzle has an orifice that is co-axial with the main chamber of the housing. The dispensing unit further comprises an assembly coupled to the dispensing unit and configured to drive the up-and down movement of the reciprocating piston assembly. The assembly includes a housing coupled to the main housing. The housing has a chamber co-axial with the main chamber. The assembly further includes an actuator disposed in the chamber and axially movable within the chamber. The actuator is configured to engage the reciprocating piston assembly and to drive the downward movement of the reciprocating piston assembly. The reciprocating piston assembly includes a first piston portion having a lower end configured to pressurize fluid within the orifice of the nozzle and a second piston portion that is separate from the first piston portion and having an upper end configured to engage the actuator. The first piston portion is configured to move a first distance and the second piston portion is configured to move a second distance.

Embodiments of the dispensing unit further may include threadably coupling the housing to the main housing to adjust the second distance of the second piston portion. The dispensing unit further may include a spring disposed within the chamber and configured to engage the actuator. The spring may be configured to bias the actuator in a downward direction. The dispensing unit further may include an air lift piston body secured to the second piston portion. The air lift piston body may be configured to drive the upward movement of the second piston portion and the actuator when pressurized air is delivered to a portion of the chamber below the air lift piston body. The actuator may include a flange provided at an end of the actuator. The flange may be configured to engage the housing when moving the second distance. The dispensing unit further may include a fluid lift adjuster secured to the main housing. The fluid lift adjuster may be configured to limit the first distance movement of the first piston portion. The first piston portion may include a collar configured to engage the fluid lift adjuster to limit the first distance of movement of the first piston portion.

Yet another aspect of the present disclosure is a method of operating a dispenser to dispense material on a substrate. The dispenser comprises a main housing having a main chamber, a reciprocating piston assembly disposed in the main chamber and axially movable within the main chamber, and a nozzle coupled to the main housing. The nozzle has an orifice that is co-axial with the main chamber of the housing. The dispenser further comprises an assembly coupled to the dispensing unit and configured to drive the up-and down movement of the reciprocating piston assembly. The reciprocating piston assembly includes a first piston portion and a second piston portion. In one embodiment, the method comprises: moving the first piston portion of the reciprocating piston assembly a first distance; and moving the second piston portion of the reciprocating piston assembly a second distance. The second distance is greater than the first distance.

Embodiments of the method further may include adjusting the second distance of the second piston portion. The method further may include biasing an actuator coupled to the second piston portion in a downward direction. The method further may include driving the upward movement of the second piston portion and the actuator when pressurized air is delivered to a portion of the chamber below an air lift piston body. The actuator may include a flange provided at an end of the actuator. The flange may be configured to engage the housing when moving the second distance. The method further may include limiting the first distance of movement of the first piston portion with a fluid lift adjuster secured to the second piston portion.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE DISCLOSURE

Figure 1:
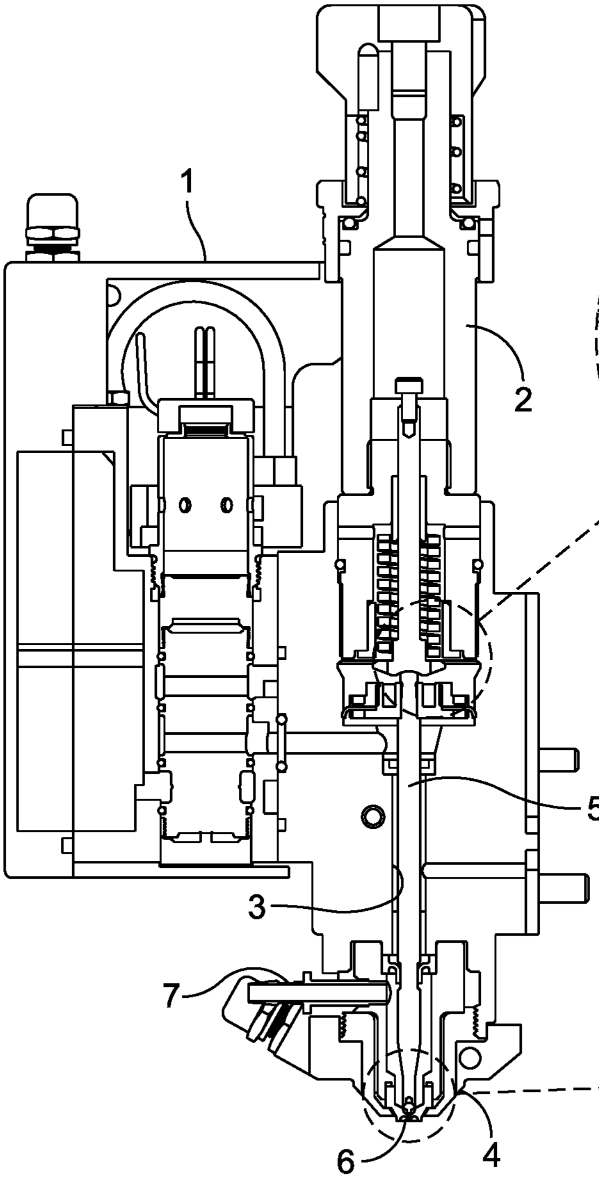
FIG. 1 (PRIOR ART)
FIG. 1 is a cross-sectional view of a known dispensing unit.
Figure 2A:
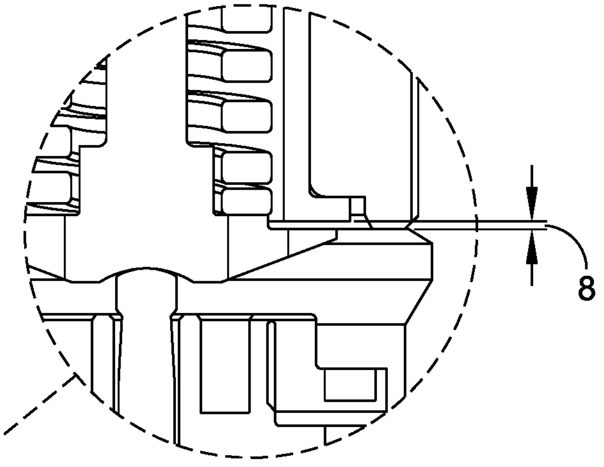
FIG. 2A (PRIOR ART)
FIG. 2A is an enlarged cross-sectional view of a portion illustrating an air lift distance of the dispensing unit shown in FIG. 1.
Figure 2B:
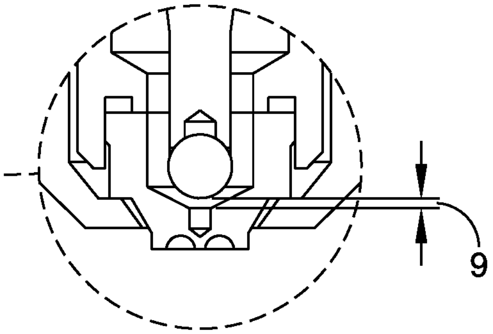
FIG. 2B (PRIOR ART)
FIG. 2B is an enlarged cross-sectional view of another portion illustrating a fluid intake lift distance of the dispensing unit shown in FIG. 1.

For the purposes of illustration only, and not to limit the generality, the present disclosure will now be described in detail with reference to the accompanying figures. This disclosure is not limited in its application to the details of construction and the arrangement of components set forth in the following description or illustrated in the drawings. The principles set forth in this disclosure are capable of other embodiments and of being practiced or carried out in various ways. Also the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Various embodiments of the present disclosure are directed to viscous material dispensing systems, devices including dispensing systems. Embodiments disclosed herein are directed to techniques for dispensing material on an electronic substrate by a dispensing unit that is configured to control a current flowing in a coil of a pneumatic solenoid valve at a desired level.

Figure 3:
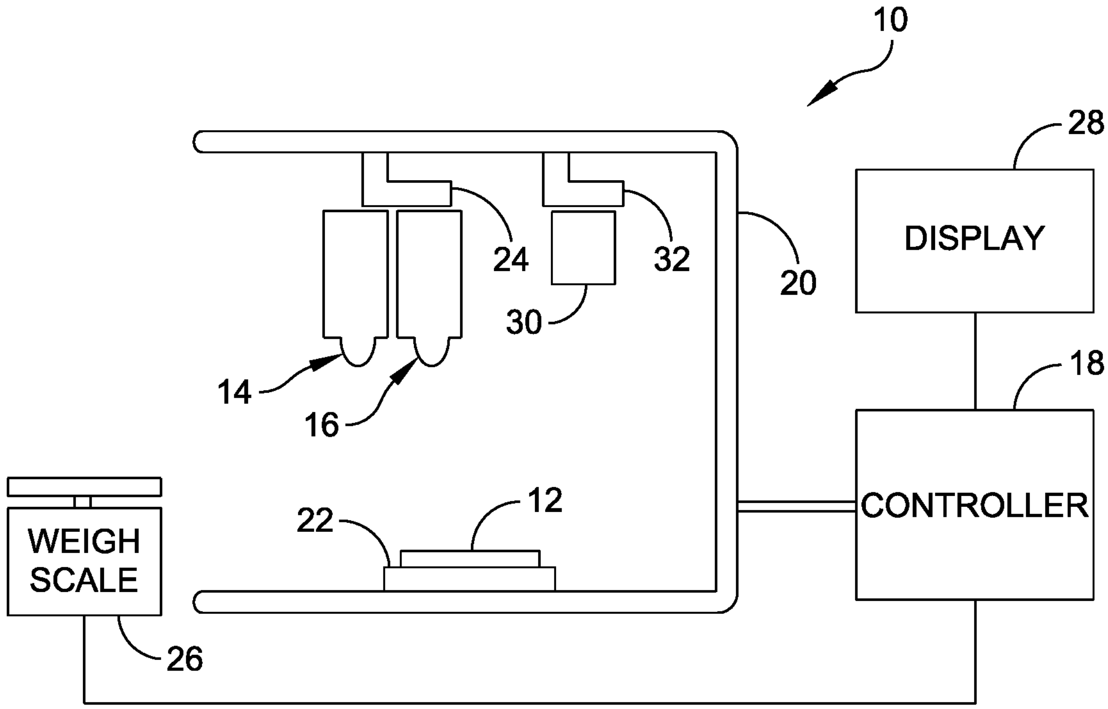
FIG. 3 is a schematic view of a dispenser of an embodiment of the present disclosure.

FIG. 3 schematically illustrates a dispenser, generally indicated at 10, according to one embodiment of the present disclosure. The dispenser 10 is used to dispense a viscous material (e.g., an adhesive, encapsulent, epoxy, solder paste, underfill material, etc.) or a semi-viscous material (e.g., soldering flux, etc.) onto an electronic substrate 12, such as a printed circuit board or semiconductor wafer. The dispenser 10 may alternatively be used in other applications, such as for applying automotive gasketing material or in certain medical applications or for applying conductive inks. It should be understood that references to viscous or semi-viscous materials, as used herein, are exemplary and intended to be non-limiting. The dispenser 10 includes first and second dispensing units, generally indicated at 14 and 16, respectively, and a controller 18 to control the operation of the dispenser. It should be understood that dispensing units also may be referred to herein as dispensing pumps and/or dispensing heads. Although two dispensing units are shown, it should be understood that one or more dispensing units may be provided.

The dispenser 10 may also include a frame 20 having a base or support 22 for supporting the substrate 12, a dispensing unit gantry 24 movably coupled to the frame 20 for supporting and moving the dispensing units 14, 16, and a weight measurement device or weigh scale 26 for weighing dispensed quantities of the viscous material, for example, as part of a calibration procedure, and providing weight data to the controller 18. A conveyor system (not shown) or other transfer mechanism, such as a walking beam, may be used in the dispenser 10 to control loading and unloading of substrates to and from the dispenser. The gantry 24 can be moved using motors under the control of the controller 18 to position the dispensing units 14, 16 at predetermined locations over the substrate. The dispenser 10 may include a display unit 28 connected to the controller 18 for displaying various information to an operator. There may be an optional second controller for controlling the dispensing units. Also, each dispensing unit 14, 16 can be configured with a z-axis sensor to detect a height at which the dispensing unit is disposed above the electronic substrate 12 or above a feature mounted on the electronic substrate. The z-axis sensor is coupled to the controller 18 to relay information obtained by the sensor to the controller.

Prior to performing a dispensing operation, as described above, the substrate, e.g., the printed circuit board, must be aligned or otherwise in registration with a dispenser of the dispensing system. The dispenser further includes a vision system 30, which, in one embodiment, is coupled to a vision system gantry 32 movably coupled to the frame 20 for supporting and moving the vision system. This embodiment is also illustrated in FIG. 3. In another embodiment, the vision system 30 may be provided on the dispensing unit gantry 24. As described, the vision system 30 is employed to verify the location of landmarks, known as fiducials, or components on the substrate. Once located, the controller can be programmed to manipulate the movement of one or more of the dispensing units 14, 16 to dispense material on the electronic substrate.

Systems and methods of the present disclosure are directed to dispensing material onto a substrate, e.g., a circuit board. The description of the systems and methods provided herein reference exemplary electronic substrates 12 (e.g., printed circuit boards), which are supported on the support 22 of the dispenser 10. In one embodiment, the dispense operation is controlled by the controller 18, which may include a computer system configured to control material dispensers. In another embodiment, the controller 18 may be manipulated by an operator. The controller 18 is configured to manipulate the movement of the vision system gantry 32 to move the vision system so as to obtain one or more images of the electronic substrate 12. The controller 18 further is configured to manipulate the movement of the dispensing unit gantry 24 to move the dispensing units 14, 16 to perform dispensing operations.

Embodiments of the present disclosure are directed to a dispensing unit, such as dispensing units 14, 16, each being configured to independently adjust and control an air lift distance and a fluid intake lift distance. In some embodiments, the air lift distance can be ten times (10×) greater than the fluid intake lift distance. In one embodiment, a two-part reciprocating piston of embodiments of the present disclosure can be employed on a dispensing platform, such as a NuJet™ dispensing unit offered by ITW EAE of Hopkinton, MA.

Figure 4:
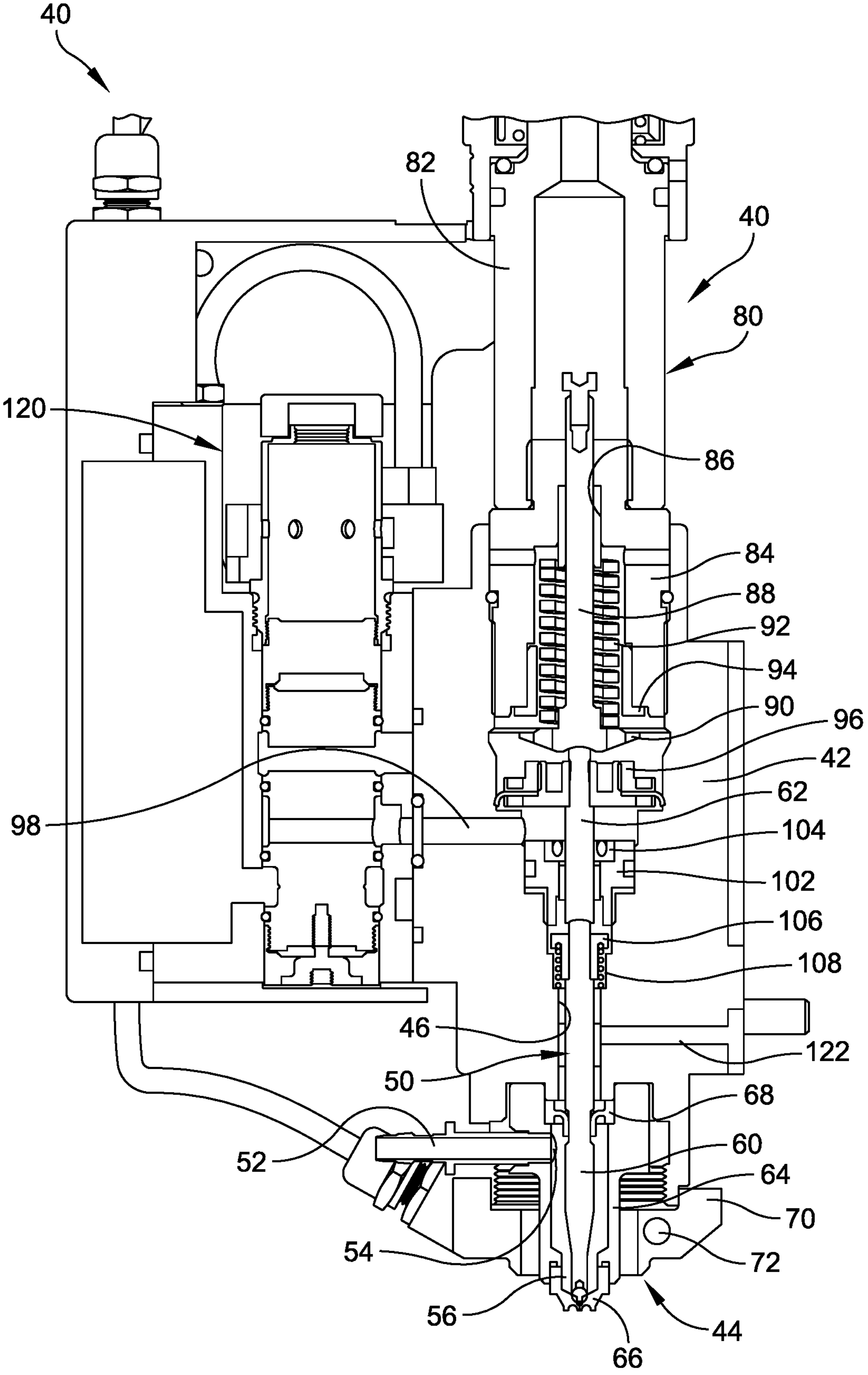
FIG. 4 is a cross-sectional view of a dispensing unit of an embodiment of the present disclosure.
Figure 5:
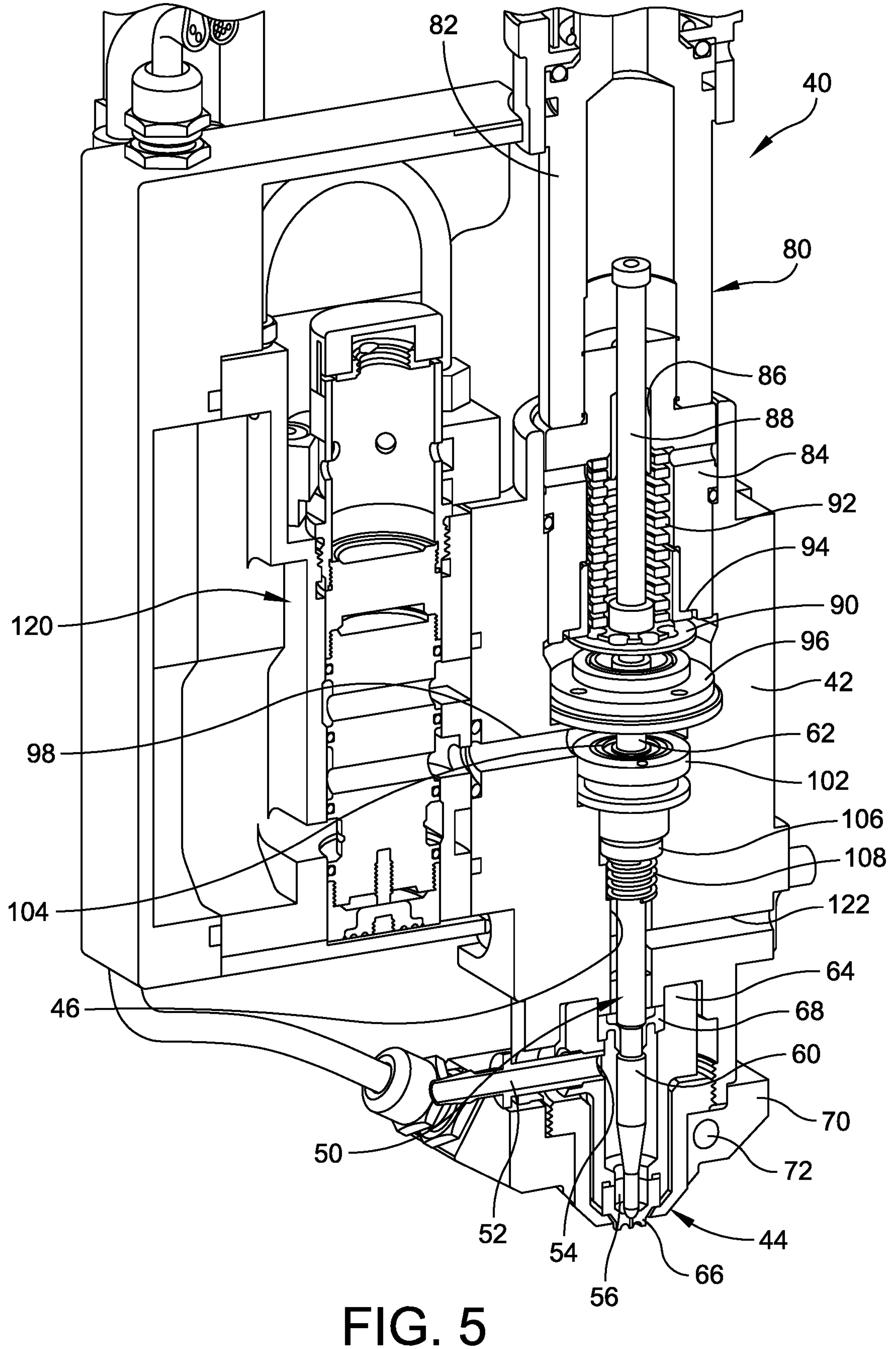
FIG. 5 is a perspective cross-sectional view of the dispensing unit shown in FIG. 4.

Referring to FIGS. 4 and 5, in one embodiment, a dispensing unit, generally indicated at 40, of an embodiment of the present disclosure is configured to dispense dots of assembly material, e.g., underfill. The dispensing unit 40 may be provided in the dispenser 10 shown in FIG. 3. The dispensing unit 40 includes a main housing 42 and a nozzle assembly, generally indicated at 44, which is releasably secured to the main housing. Specifically, the main housing 42 is configured to define an elongate chamber 46, which receives viscous material for dispensing. A reciprocating piston assembly, generally indicated at 50, is disposed within the elongate chamber 46. The elongate chamber 46 defines a dispensing cavity that is in fluid communication with a material supply feed tube 52, which is adapted to receive assembly material from a material supply assembly (cartridge). The material supply feed tube 52 introduces viscous material within the elongate chamber 46 through an inlet 54. The viscous material is delivered to the elongate chamber 46 to a small dispensing cavity 56 within the elongate chamber under pressure. The reciprocating piston assembly 50 is of two-part construction, including a fluidic piston 60 and an air lift piston 62 that is separate from the fluidic piston. As used herein, the fluidic portion 60 is sometimes referred to as a first piston portion and the air lift piston 62 is sometimes referred to as a second piston portion. As shown, the fluidic piston 60 is positioned below the air lift piston 62, with the fluidic piston 60 being biased in an upward direction and the air lift piston 62 being biased in a downward direction. The fluidic piston 60 and the air lift piston 62 of the reciprocating piston assembly 50 are configured to be received and slidably moved within the elongate chamber 46.

Figure 6:
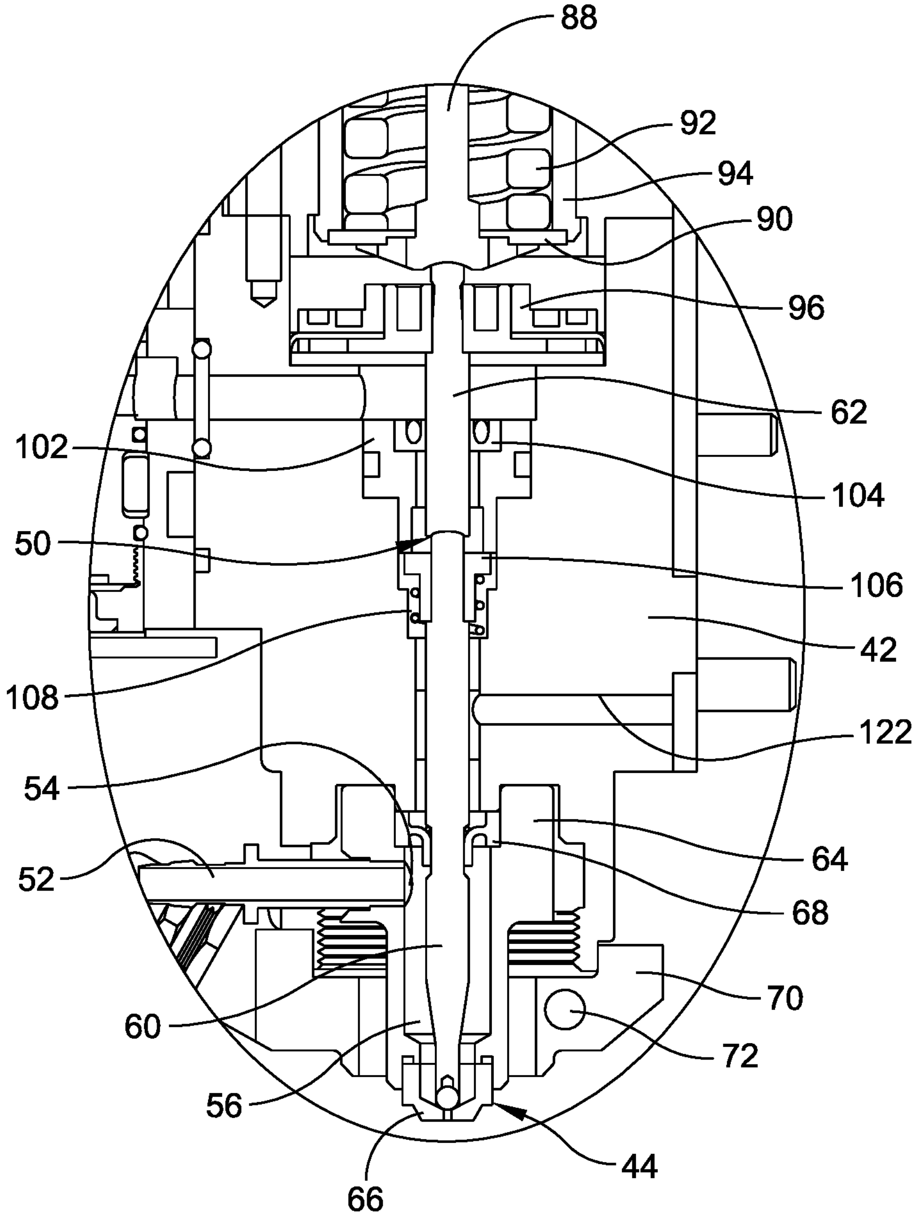
FIG. 6 is an enlarged cross-sectional view of a portion illustrating a two-stage actuator of the dispensing unit shown in FIG. 4.

Referring additionally to FIG. 6, the fluidic piston 60 of the reciprocating piston assembly 50 of the dispensing unit 40 is prominently illustrated. As shown, the dispensing unit 40 includes a fluidic housing 64 that defines the dispensing cavity 56 within the elongate chamber 46. The nozzle assembly 44 includes a valve seat 66 that is positioned at a lower end of the fluidic housing 64. A nozzle nut (not shown for clarity) is threadably secured to the main housing 42, and provided to secure the valve seat 66 in place with respect to the fluidic housing 64 and the main housing 42. The valve seat 66 includes a generally cylindrical member having a conical surface and a small-diameter bore formed therein. In one embodiment, the valve seat 66 may be fabricated from a hard material, such as carbide or ceramic materials. A diaphragm seal 68 is supported by the fluidic housing 64 and provided to seal the fluidic piston 60 of the reciprocating piston assembly 50 to maintain viscous material within the dispensing cavity 56 of the elongate chamber 46 above the valve seat 66. The arrangement is such that viscous material is ejected from the small-diameter bore of the valve seat 66 onto a substrate, e.g., circuit board 12, when the reciprocating piston assembly 50 engages the valve seat.

In one embodiment, the nozzle assembly 44 may be provided as a complete assembly to the end user of the dispenser to aid in cleaning of the nozzle assembly. Specifically, a used nozzle assembly may be completely removed from the main housing 42 of the dispensing unit 40 by unscrewing the nozzle nut and replaced with a new (clean) nozzle assembly.

In one embodiment, a nozzle heater 70 is secured to the lower end of the main housing 42 to control a temperature of the assembly material within the dispensing cavity 56.

The nozzle heater 70 includes a heater element 72 to provide controlled heat to the nozzle assembly 44. The viscosity of the assembly material effects the dispensing of the material through the small-diameter bore of the valve seat 66 of the nozzle assembly 44. The nozzle heater 70 is provided to assist in controlling the viscosity of the assembly material to optimize a dispensing operation.

In operation, the fluidic piston 60 of the reciprocating piston assembly 50 is moveable between an upper position and a lower position within the elongate chamber 46 of the main housing 42. The dispensing medium, e.g., underfill, is introduced under pressure into the dispensing cavity 56 of the elongate chamber 46 through the inlet 54 and the dispensing material flows through the fluidic housing 64 to an open space above the valve seat 66. In the lower position, the fluidic piston 60 is seated against the valve seat 66 and in the upper position, the fluidic piston is raised out of the valve seat of the nozzle assembly a predetermined distance. As will be described in greater detail below, an actuator assembly is provided to drive the reciprocating movement of the fluidic piston 60 and the air lift piston 62 of the reciprocating piston assembly 50 within the elongate chamber 46 to dispense viscous material. In some embodiments, the actuator assembly may include one of an air valve assembly, a piezoelectric actuator, a voice coil motor or some other suitable actuator, which controls the movement of the reciprocating piston assembly 50, and operation of the actuator assembly causes the movement of the fluidic piston 60 of the reciprocating piston assembly 50 between the upper and lower positions. When the fluidic piston 60 moves to its lowered position against the valve seat 66, a small drop of material is dispensed through the small diameter bore provided in the valve seat.

The dispensing unit 40 provides pressurized air to the source of dispensing material to introduce the material into the elongate chamber 46 of the main housing 42 of the dispensing unit by the material supply feed tube 52. The particular pressure provided may be selected based on the material being used, volume of material being dispensed, and mode of operation of the dispensing unit 40. During operation of the dispenser, a user, through the user interface for the dispensing platform, defines dispensing areas on a circuit board. The dispensing unit 40 may be used to dispense dots and lines of material. When the dispensing unit 40 is used to dispense lines of material formed through multiple dispensing cycles of the dispenser and is used to dispense material at selected locations on a circuit board or other substrate using an individual dispensing cycle. For lines of material, a user defines the start and stop positions of a line, and the dispensing platform is able to move the dispensing unit to place material along the line. Once all dispensing areas on a circuit board are defined and the dispensing parameters set using a dispensing unit control panel, the dispenser is able to receive circuit boards for processing. After moving a circuit board to a dispensing location, the dispenser controls the gantry system to position the dispensing unit 40 over a dispensing location. In another embodiment, the circuit board may be moved under a stationary dispensing unit. Dispensing for a particular board will continue until material has been dispensed at all locations on the board. The board is then unloaded from the system and a new board can be loaded into the system.

Still referring to FIGS. 4 and 5, the dispensing unit 40 further includes an air lift adjuster assembly, generally indicated at 80. The air lift adjuster assembly 80 is configured to provide downward movement to the reciprocating piston assembly 50. As shown, the air lift adjuster assembly 80 includes an upper adjuster housing 82 and a lower adjuster housing 84 that is coupled to and disposed below the upper adjuster housing. The lower adjuster housing 84 is threadably secured to the main housing 42 of the dispensing unit 40. The upper and lower adjuster housings 80, 82 are each configured with elongate chamber, indicated at 86, which is coaxial with the elongate chamber 46 of the main housing 42 along a common axis. The air lift adjuster assembly 80 further includes an actuator 88 disposed in the elongate chamber 86. A portion of the lower adjuster housing 84 guides an up-and-down movement of the actuator 88 within the lower adjuster housing and the upper adjuster housing 82.

A lower end of the actuator 88 includes a flange 90 that is engaged by a spring 92 to bias the actuator downwardly within the elongate chamber 86 of the lower adjuster housing 84. As shown, the spring 92 engages a portion of the lower adjuster housing 84 and the flange 90 to bias the actuator 88 downwardly. The lower end of the actuator 88 is configured to engage an upper end of the air lift piston 62 of the reciprocating piston assembly 50 so that movement of the actuator 88 causes movement of the air lift piston of the reciprocating piston assembly 50.

The amount of up-and-down adjustment of the actuator 88 is controlled by rotating the upper adjuster housing 82, which causes the rotation of the lower adjuster housing 84, to adjust a distance between the flange 90 and a bushing 94 provided within the lower adjuster housing. The greater the distance between the flange 90 and the bushing 94, the greater the movement of the actuator 88 and thus the greater a velocity achieved of the actuator when driving the downward movement of the reciprocating piston assembly 50. The engagement of the flange 90 and the bushing 94 limits the upward movement of the actuator 88.

The amount of up-and-down movement of the actuator 88 is further effected by an air lift piston assembly, which is provided to move the actuator upwardly against the bias of the spring 92. As shown, the air lift piston assembly includes a disk-shaped air lift body 96 secured to the air lift piston 62 of the reciprocating piston assembly 50 in a position in which an upper end of the air lift piston extends beyond the disk-shaped body. The arrangement is such that the pressurized air introduced to a portion of the elongate chamber 46 below the air lift body 96 by air line 98 causes the upward movement of the actuator 88 against the bias of the spring 92. As mentioned above, by rotating the upper adjuster housing 82 (and thus the lower adjuster housing 84) with respect to the main housing 42, an axial distance between the flange 90 and the bushing 94 of the lower adjuster housing 84 can be adjusted to create an air gap between the flange and the bushing. This air gap enables a greater distance between the actuator 88 and an upper end of the air lift piston 62 of the reciprocating piston assembly 50 to create a greater actuating distance and thus velocity of the actuator when dispensing material.

Figure 7A:
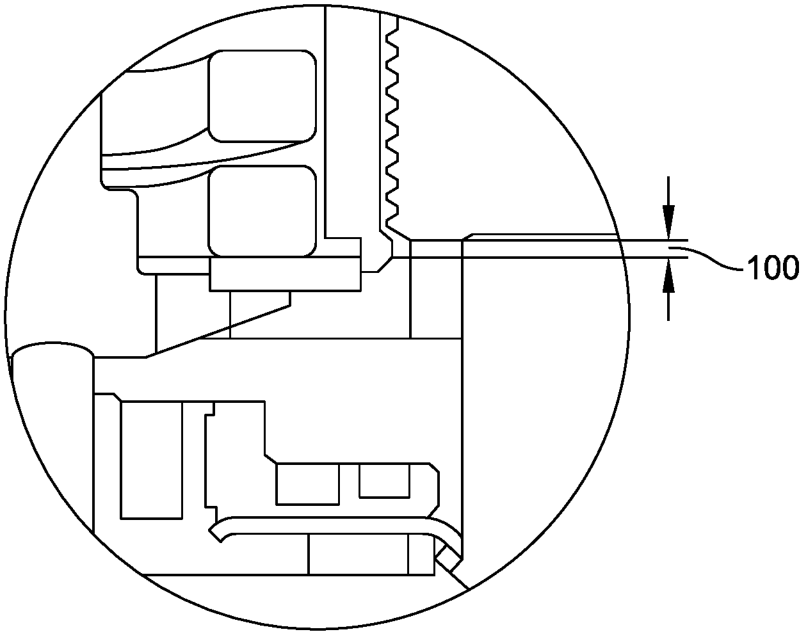
FIG. 7A is an enlarged cross-sectional view of a portion illustrating an air lift distance of the dispensing unit shown in FIG. 4.

The greater the air gap distance the greater the distance of the actuator and the reciprocating piston assembly movement. Conversely, the smaller the air gap distance the smaller the distance of the actuator and piston movement. As mentioned above, the greater the distance, a higher velocity piston impact is generated by the fluidic piston 60 of the reciprocating piston assembly 50 on the valve seat 66 to impart a higher level of kinetic energy, thus increasing the ability to jet smaller sized dots. FIG. 7A illustrates an air lift distance 100.

Figure 7B:
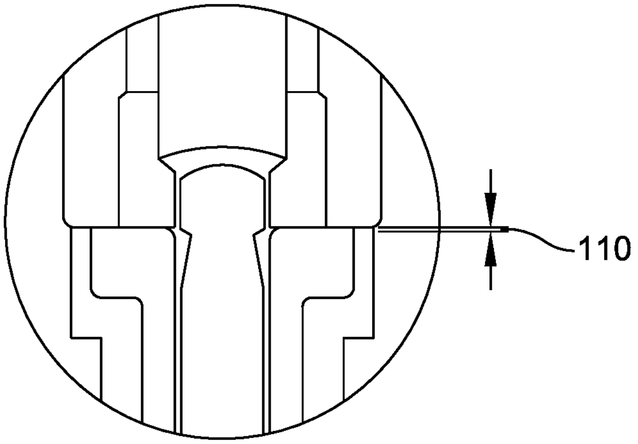
FIG. 7B is an enlarged cross-sectional view of another portion illustrating a fluid intake lift distance of the dispensing unit shown in FIG. 4.

The dispensing unit 40 further includes a fluid lift adjuster assembly to adjust the fluid intake lift distance. As shown, the fluid lift adjuster assembly includes a fluid lift adjuster 102 coupled to the air lift piston 62 of the reciprocating piston assembly 50 and disposed within the elongate chamber 46 of the main housing 42. The fluid lift adjuster 102 includes a cup seal 104 to contain the pressurized air beneath the air lift body 96. A fluid lift collar 106 is secured to an upper end of the fluidic piston 60 of the reciprocating piston assembly 50. A spring 108 is disposed between the fluid lift collar 106 and the main housing 42 to bias the fluid lift collar upwardly. The fluid lift adjuster 102 is secured to the main housing 42 with a precision thread and guides the reciprocating piston assembly 50, and is configured to engage the fluid lift collar 106. The axial position of the fluid lift adjuster 102 determines a fluid intake lift distance of the fluidic piston 60 of the reciprocating piston assembly 50. FIG. 7B illustrates a fluid intake lift distance 110.

Since the air lift piston 62 of the reciprocating piston assembly 50 is separated from the fluidic piston 60 of the reciprocating piston assembly, the air lift distance 100 can be independently controlled with respect to the fluid intake lift distance 110. If it is desired to minimize the impact of the fluidic piston 60 on the valve seat 66, the air lift distance 100 is minimized. If it is desired to maximize the impact of the fluidic piston 60 on the valve seat 88, the air lift distance 100 is maximized. As a result, the fluidic piston 60 is configured to move a first distance and the air lift piston 62 is configured to move a second distance, with the second distance can be greater than the first distance. In some embodiments, the second distance achieved by the air lift piston 62 is 10× greater than the first distance achieved by the fluidic piston 60. It should be understood that the first distance can be configured to be greater than the second distance if desired. The movement of the fluidic piston 60 can be configured to be the same as or different than the movement of the air lift piston 62.

As mentioned above, to produce smaller dots of material, it is desirable to optimize the air lift distance 100 and the fluid intake lift distance 110. In one example, the air lift distance 100 is 250 microns and the fluid intake lift distance 110 is 100 microns. Other optimized distances can be provided, depending on the material being dispensed.

If it is desired to minimize the amount of material that is introduced to the elongate chamber 46 of the main housing 42, the fluid intake lift distance 110 is minimized. If it is desired to maximize the amount of material that is introduced to the elongate chamber 46 of the main housing 42, the fluid intake lift distance 110 is maximized. As mentioned above, to produce smaller dots of material, it is desirable to minimize the amount of material delivered to the dispensing cavity 56 of the elongate chamber 46 of the main housing 42, thus minimizing the fluid intake lift distance 110.

It should be observed that the air lift distance 100 and the fluid intake lift distance 110 can be adjusted independently from one another. The air lift distance 100 is achieved by adjusting the upper adjuster housing 82 as described above. The fluid lift distance 110 is achieved by adjusting the fluid lift adjuster 102 as described above. The independent adjustment enables the optimization of controlling the size of dots dispensed by the dispensing unit 40.

In one embodiment, an air valve assembly, generally indicated at 120, provides reciprocating axial movement of the reciprocating piston assembly. Specifically, during operation of the dispensing unit 40, the air valve assembly 120, along with the air lift adjuster assembly, drives the up-and-down movement of the reciprocating piston assembly 50. In a certain embodiment, the air valve assembly 120 directs pressurized air into the elongate chamber 46 of the main housing 42 via air line 98 directly below the disk-shaped air lift body 96. The air valve assembly 120 can be configured to provide pressurized air to drive the upward movement of the air lift body and the actuator against the bias of spring 108. A vent 122 is provided to exhaust air from the elongate chamber 46 of the main housing 42. The air valve assembly 120 supplies pressurized air and then exhausts the pressurized air via air line 98. This enables the air lift piston 62 and the fluidic piston 60 of the reciprocating piston assembly 50 to dispense a dot of material through the small-diameter bore of the valve seat 66. In one embodiment, the operation of the air valve assembly 120 operates at speeds of 300 cycles per second (300 Hertz). The air valve assembly 120 can be configured to operate a desired speed.

Since the fluidic piston 60 is separate from the air lift piston 62 of the reciprocating piston assembly 50, the fluidic piston is enabled to maintain a relatively small fluid intake distance 110. Thus, when the air valve assembly 120 cycles pressurized air into the elongate chamber 46 of the main housing 42, the air lift body 96 and the air lift piston 62 can separate from the fluidic piston 60 thereby enabling a greater air lift distance 100 of the air lift piston. The actuator 88 and the air lift piston 62 can achieve a greater distance of movement thereby achieving a greater velocity of the fluidic piston 60 to generate smaller dots of material.

In other embodiments, the air valve assembly 120 can be replaced by a piezoelectric actuator assembly that is coupled to the air lift adjuster assembly to effect the rapid up-and-down movement of the reciprocating piston assembly 50. The piezoelectric actuator assembly can operate at a speed up to 1,000 Hertz. A sensor assembly can be included to provide a closed-loop detection of the movement of the piezoelectric actuator assembly. The sensor assembly may be used as part of a control system to provide feed-forward control of the reciprocating motion of the piston. An adaptive routine may be provided that can vary drive signals used to drive the actuator assembly to ensure a desired motion profile is achieved, even as operating parameters, such as viscosity, vary. For example, viscosity of the material can change with time and temperature. This change in viscosity may cause a load on the actuator assembly to change, and thus alter an actual motion achieved. By sensing this change in motion profile, subsequent drive signals can be adjusted as required to maintain a desired motion profile. Since these operating parameter changes tend to drift slowly with time and temperature, the feed-forward adaptive routine can track these variations in real time. This is different in nature from a feed-back control system, in which the drive signal is varied in real time at the full bandwidth of the system. The adaptation in the feed-forward control system only needs to adapt at rates faster than the variations for which it is intended to compensate. An overwhelming advantage of feed-forward control systems is that unlike feed-back control systems, they can be designed to be unconditionally stable.

In another embodiment, a voice coil motor actuator assembly may be provided to operate the dispensing unit. The voice coil motor actuator assembly is well known in the art and may be suitably coupled to the dispensing unit to drive the operation of the piston.

In operation, the dispensing unit is positioned at a nominal clearance height above the substrate, e.g., circuit board 12. This clearance height is maintained at a relatively consistent elevation above the circuit board throughout the dispense operation, although variations in the height of the circuit board, or irregularities in the flatness of the top surface of the circuit board, may cause the clearance height to vary without adversely impacting the dispensing of viscous material. Specifically, the dispensing unit does not need to lift the nozzle away from the circuit board in the z-axis direction at the end of each dispense operation. However, to accommodate variations in the height of the circuit board and irregularities in the flatness of the circuit board (or to even avoid obstacles), the dispenser may be configured to achieve z-axis movement. In certain embodiments, a laser detection system may be used to determine a height of the dispenser.

Figure 8:
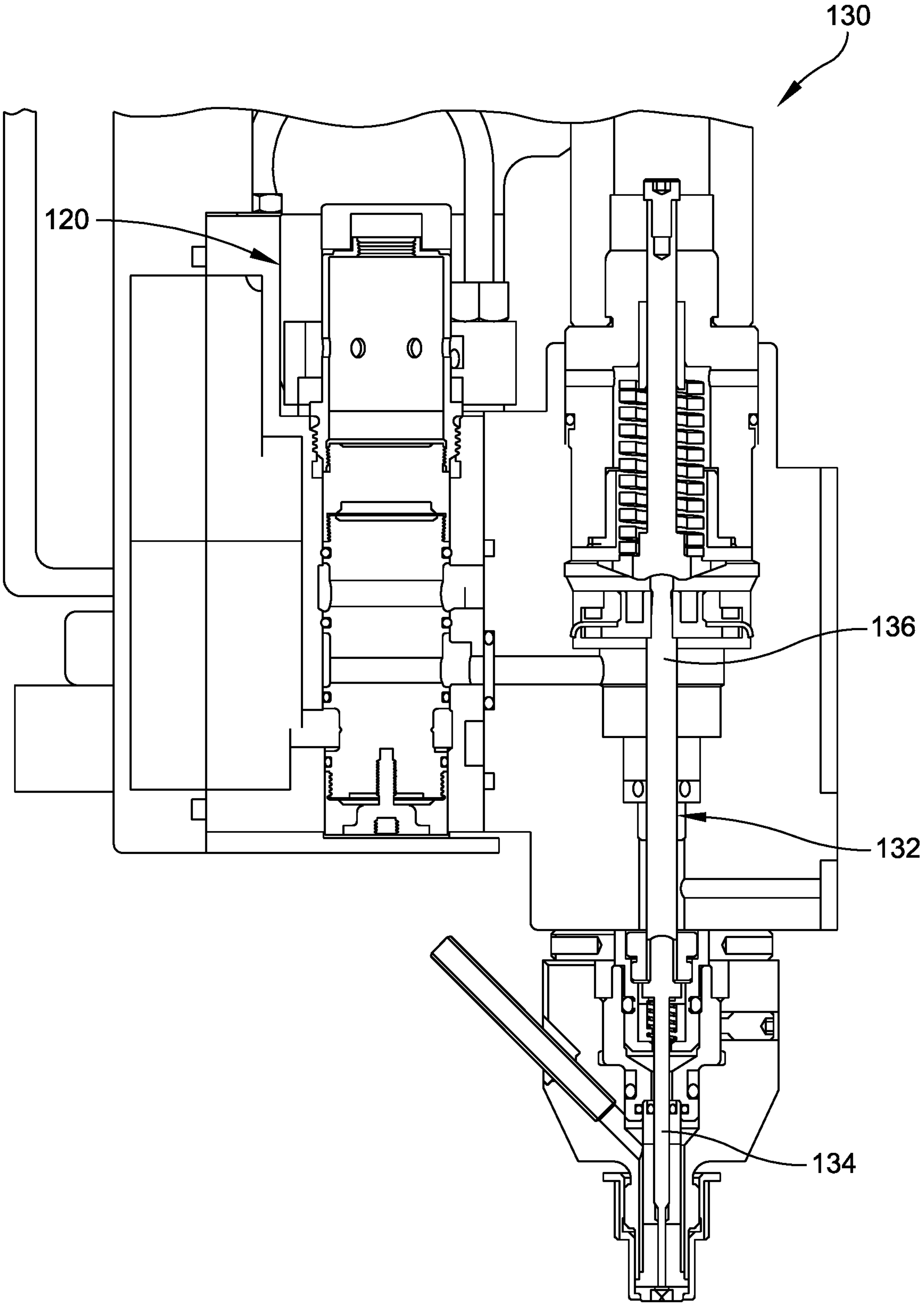
FIG. 8 is a cross-sectional view of a dispensing unit of another embodiment of the present disclosure.

In another embodiment, the two-part reciprocating piston can be employed on another platform, such as a SmartStream™ dispensing unit offered by ITW EAE. For example, referring to FIG. 8, in another embodiment, a dispensing unit is generally indicated at 130. As with dispensing unit 40, the dispensing unit 130 is configured to dispense dots of assembly material, e.g., underfill, on a substrate. The dispensing unit 130 may be provided in the dispenser 10 shown in FIG. 3. The primary difference between the dispensing unit 130 and the dispensing unit 40, the dispensing unit 130 dispenses viscous material, e.g., an underfill material, by pressure generated by a reciprocating piston assembly within a dispensing cavity and through a valve. Stated another way, the dispensing unit 130 operates by generating pressure to dispense the viscous material rather than an impact of a piston against a valve seat. As shown, the dispensing unit 130 includes a two-part reciprocating piston assembly 132 having a fluidic piston 134 and an air lift piston 136 that is separate from the fluidic piston. The operation of the reciprocating piston assembly 132 is similar to the operation of the reciprocating piston assembly 50.

Various controllers, such as the controller 18, may execute various operations discussed above. Using data stored in associated memory and/or storage, the controller 18 also executes one or more instructions stored on one or more non-transitory computer-readable media, which the controller 18 may include and/or be coupled to, that may result in manipulated data. In some examples, the controller 18 may include one or more processors or other types of controllers. In one example, the controller 18 is or includes at least one processor. In another example, the controller 18 performs at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A dispenser configured to dispense material on a substrate, the dispenser comprising:

a frame;

a support coupled to the frame and configured to receive the substrate;

a gantry coupled to the frame;

a dispensing unit supported by the gantry and configured to dispense material on the substrate, the dispensing unit including a main housing having a main chamber, a reciprocating piston assembly disposed in the main chamber and axially movable within the main chamber, a nozzle coupled to the main housing, the nozzle having an orifice that is co-axial with the main chamber of the housing, and an assembly coupled to the dispensing unit and configured to drive the up-and down movement of the reciprocating piston assembly, the assembly including a housing coupled to the main housing, the housing having a chamber co-axial with the main chamber, and an actuator disposed in the chamber and axially movable within the chamber, the actuator being configured to engage the reciprocating piston assembly and to drive the downward movement of the reciprocating piston assembly, wherein the reciprocating piston assembly includes a first piston portion having a lower end configured to pressurize fluid within the orifice of the nozzle and a second piston portion that is separate from the first piston portion and having an upper end configured to engage the actuator, and wherein the first piston portion is configured to move a first distance and the second piston portion is configured to move a second distance, which is different than the first distance.

2. The dispenser of claim 1, wherein the housing is threadably coupled to the main housing to adjust the second distance of the second piston portion.

3. The dispenser of claim 2, wherein the dispensing unit further includes a spring disposed within the chamber and configured to engage the actuator, the spring being configured to bias the actuator in a downward direction.

4. The dispenser of claim 3, wherein the dispensing unit further includes an air lift piston body secured to the second piston portion, the air lift piston body being configured to drive the upward movement of the second piston portion and the actuator when pressurized air is delivered to a portion of the main chamber below the air lift piston body.

5. The dispenser of claim 2, wherein the actuator includes a flange provided at an end of the actuator, the flange being configured to engage the housing when moving the second distance.

6. The dispenser of claim 1, wherein the dispensing unit further includes a fluid lift adjuster secured to the main housing, the fluid lift adjuster being configured to limit the first distance movement of the first piston portion.

7. The dispenser of claim 6, wherein the first piston portion includes a collar configured to engage the fluid lift adjuster to limit the first distance of movement of the first piston portion.

8. A dispensing unit of a dispenser configured to dispense material on a substrate, the dispensing unit comprising:

a main housing having a main chamber;

a reciprocating piston assembly disposed in the main chamber and axially movable within the main chamber;

a nozzle coupled to the main housing, the nozzle having an orifice that is co-axial with the main chamber of the housing; and an assembly coupled to the dispensing unit and configured to drive the up-and down movement of the reciprocating piston assembly, the assembly including a housing coupled to the main housing, the housing having a chamber co-axial with the main chamber, and an actuator disposed in the adjuster chamber and axially movable within the chamber, the actuator being configured to engage the reciprocating piston assembly and to drive the downward movement of the reciprocating piston assembly, wherein the reciprocating piston assembly includes a first piston portion having a lower end configured to pressurize fluid within the orifice of the nozzle and a second piston portion that is separate from the first piston portion and having an upper end configured to engage the actuator, and wherein the first piston portion is configured to move a first distance and the second piston portion is configured to move a second distance, which is different than the first distance.

9. The dispensing unit of claim 8, wherein the housing is threadably coupled to the main housing to adjust the second distance of the second piston portion.

10. The dispensing unit of claim 9, further comprising a spring disposed within the chamber and configured to engage the actuator, the spring being configured to bias the actuator in a downward direction.

11. The dispensing unit of claim 10, further comprising an air lift piston body secured to the second piston portion, the air lift piston body being configured to drive the upward movement of the second piston portion and the actuator when pressurized air is delivered to a portion of the main chamber below the air lift piston body.

12. The dispensing unit of claim 9, wherein the actuator includes a flange provided at an end of the actuator, the flange being configured to engage the housing when moving the second distance.

13. The dispensing unit of claim 8, further comprising a fluid lift adjuster secured to the main housing, the fluid lift adjuster being configured to limit the first distance movement of the first piston portion.

14. The dispensing unit of claim 13, wherein the first piston portion includes a collar configured to engage the fluid lift adjuster to limit the first distance of movement of the first piston portion.

15. A method of operating a dispenser to dispense material on a substrate, the dispenser comprising a main housing having a main chamber, a reciprocating piston assembly disposed in the main chamber and axially movable within the main chamber, a nozzle coupled to the main housing, the nozzle having an orifice that is co-axial with the main chamber of the housing, and an assembly coupled to the dispensing unit and configured to drive the up-and down movement of the reciprocating piston assembly, the reciprocating piston assembly including a first piston portion and a second piston portion, the method comprising:

moving the first piston portion of the reciprocating piston assembly a first distance; and moving the second piston portion of the reciprocating piston assembly a second distance, wherein the second distance being greater than the first distance.

16. The method of claim 15, further comprising adjusting the second distance of the second piston portion.

17. The method of claim 15, further comprising biasing an actuator coupled to the second piston portion in a downward direction.

18. The method of claim 17, further comprising driving the upward movement of the second piston portion and the actuator when pressurized air is delivered to a portion of the main chamber below an air lift piston body of the second piston portion.

19. The method of claim 17, wherein the actuator includes a flange provided at an end of the actuator, the flange being configured to engage the housing when moving the second distance.

20. The method of claim 15, further comprising limiting the first distance of movement of the first piston portion with a fluid lift adjuster secured to the second piston portion.

* * * * *